Patented Feb. 6, 1923.

1,444,479

UNITED STATES PATENT OFFICE.

HANS M. OLSON, OF BURBANK, CALIFORNIA.

ABRASIVE COMPOSITION.

No Drawing. Application filed October 21, 1918. Serial No. 258,951.

*To all whom it may concern:*

Be it known that I, HANS M. OLSON, a citizen of the United States, residing at Burbank, in the county of Los Angeles and State of California, have invented new and useful Improvements in Abrasive Compositions, of which the following is a specification.

This invention relates to an abrasive composition and to the method of making same.

It is the object of this invention to provide an abrasive substance and a means for forming same from diatomaceous earth by adding thereto such ingredients as when subjected to high temperature as to convert the natural soft non-crystalline formation thereof into an extremely hard crystalline formation.

Diatomaceous earth when pulverized forms a soft chalky powder free from grit and is not suitable for abrasive or polishing purposes as the minute particles thereof are round or smooth and are capable of little or no abrasive action, but by adding certain ingredients and treating same as hereinafter set forth the particles are changed to sharp crystalline form of such minuteness as to retain in appearance and to the touch the physical characteristic of soft and chalky powder.

The term "diatomaceous earth" is interchangeable and coextensive with the terms "kieselguhr", "non-crystalline silica", and "infusorial earth", and is to be here construed as inclusive of these terms as well as all other synonymous terms, and is also meant to include all earth having qualities and characteristics similar to diatomaceous earth and capable of being employed for the purpose and in substantially the same manner as herein set forth.

The substances combined with the diatomaceous earth as a binder and crystallizing agent to give it abrasive qualities consist of lime and alum, the alum supplying a double sulfate of alkali and metal, but analogous substances of substantially the same qualities may be employed without departing from the spirit and scope of the invention as set forth in the appended claims. For example it is possible to obtain like results by using a mixture of a suitable metallic sulfate and any suitable alkaline sulfate in lieu of alum, such as a mixture comprising one-half aluminum sulfate and one half sodium sulfate. Any other suitable metallic sulfate may be used in place of aluminum sulfate, and any other suitable alkaline sulfate may be used in lieu of sodium sulfate.

The proportions of the diatomaceous earth and the binder may be varied considerably according to the particular quality of product desired without departing from the invention as set forth in the claims, but a preferable mixture or composition is produced by using;

88% dry pulverized diatomaceous earth, 2% alum, and 10% lime.

Ordinarily the limits to which the different ingredients may be used are seventy-five to ninety-five per cent diatomaceous earth to the entire mass and a binder and crystallizing agent of from five to twenty five per cent of the entire mass.

The steps for forming my new abrasive composition are as follows:

First. The ingredients are finely pulverized and thoroughly commingled in a dry state.

Second. Water is added to effect a close mixture and to start a chemical action by which the diatomaceous earth is changed from a non-crystalline silica to a crystalline silica, the water being added in such quantity as to form a dry paste. From 75% to 200% of water by volume in proportion to the mass is generally employed.

Third. The moisture is evaporated from the mixture, either shortly after the addition of water or the mass may be allowed to stand, say 24 hours, to prolong the chemical action. This evaporation may be effected either by natural or artificial means.

Fourth. The mass in a lumpy state is subjected to the action of heat gradually increased from approximately 800° F. to 2700° F., which acts to accelerate and complete the crystallization and render the crystals hard. The degree of hardness imparted to the crystals is governed by the extreme of heat to which the substance is subjected, and it may be heated to a temperature of 3000° F. or more without fusing or fluxing.

The product resulting from the foregoing may be ground to any desired degree of fineness without destroying its hard crystalline character though retaining the soft appearance of the natural diatomaceous earth.

I claim;

1. The herein described composition of matter consisting of non-crystalline silica, alum, and lime, which have collectively been subject to the action of water and calcined.

2. The herein described composition of matter consisting of seventy-five to ninety five parts of non-crystalline silica, and 5 to 25 parts lime and alum, which have been mixed with water and calcined.

HANS M. OLSON.